US007663984B2

(12) United States Patent  
Yoon et al.

(10) Patent No.: US 7,663,984 B2  
(45) Date of Patent: Feb. 16, 2010

(54) OPTICAL PICKUP ACTUATOR FOR DRIVING AN OBJECTIVE LENS

(75) Inventors: Sang-yol Yoon, Seoul (KR); Dae-jong Jang, Anyang-si (KR); Young-bin Lee, Suwon-si (KR); Yong-jae Lee, Suwon-si (KR); Byung-ryul Ryoo, Suwon-si (KR); Young-won Lee, Suwon-si (KR)

(73) Assignee: Toshiba Samsung Storage Technology Korea Corporation (KR)

( * ) Notice: Subject to any disclaimer, the term of this patent is extended or adjusted under 35 U.S.C. 154(b) by 498 days.

(21) Appl. No.: 11/657,656

(22) Filed: Jan. 25, 2007

(65) Prior Publication Data

US 2007/0201323 A1  Aug. 30, 2007

(30) Foreign Application Priority Data

Feb. 25, 2006  (KR) ...................... 10-2006-0018519

(51) Int. Cl.  
*G11B 7/00* (2006.01)

(52) U.S. Cl. ................................. 369/44.15; 369/44.22

(58) Field of Classification Search ....................... None  
See application file for complete search history.

(56) References Cited

U.S. PATENT DOCUMENTS 6,343,053 B1 * 1/2002 Akanuma et al. ......... 369/44.14  
6,570,720 B2 * 5/2003 Kawano ..................... 359/813

6,587,284 B2 * 7/2003 Santo et al. ................. 359/824  
2005/0185532 A1 * 8/2005 Kang et al. ............... 369/44.22  
2008/0068974 A1 * 3/2008 Kawano ................ 369/112.08

FOREIGN PATENT DOCUMENTS

| JP | 2001-34974 | 2/2001 |
|---|---|---|
| JP | 2001-167458 | 6/2001 |
| JP | 2002-092916 | 3/2002 |
| JP | 2002-237067 | 8/2002 |
| JP | 2003-91842 | 3/2003 |
| JP | 2004-110971 | 4/2004 |
| JP | 2004-326885 | 11/2004 |
| KR | 10-2005-0077378 | 8/2005 |

OTHER PUBLICATIONS

Korean Office Action issued Jan. 17, 2007 corresponding to Korean application No. 10-2006-0018519.

* cited by examiner

*Primary Examiner*—Paul Huber  
(74) *Attorney, Agent, or Firm*—NSIP Law

(57) ABSTRACT

An optical pickup actuator which includes a base, a blade having an objective lens mounted thereon, a plurality of suspensions supporting the blade to be movable with respect to the base and forming an electroconductive path, and a magnetic circuit driving the blade according to a driving signal applied through the respective suspensions. The magnetic circuit includes a magnet fixed to the base, and a fine pattern coil installed on the blade at a position facing the magnet and having a track pattern coil, a focus pattern coil, and a tilt pattern coil independently driven by current applied through the suspensions and providing driving forces in a track direction, a focus direction, and a tilt direction of the blade.

26 Claims, 8 Drawing Sheets

OPTICAL PICKUP ACTUATOR FOR DRIVING AN OBJECTIVE LENS

CROSS-REFERENCE TO RELATED APPLICATIONS

This application claims the benefit of Korean Patent Application No. 10-2006-0018519, filed on Feb. 25, 2006, in the Korean Intellectual Property Office, the disclosure of which is incorporated herein in its entirety by reference.

BACKGROUND OF THE INVENTION

1. Field of the Invention

The present invention relates to an optical pickup actuator used for an optical recording and reproducing apparatus. More particularly, to a slim-type 3-axis driving optical pickup actuator using a fine pattern coil (FPC).

2. Description of the Related Art

A conventional optical pickup is used for an optical recording and reproducing apparatus and performs recording and/or reproduction of information in a non-contact manner with respect to an optical disk (i.e., an information storage medium). The optical pickup requires an optical pickup actuator capable of driving an objective lens in a track direction, a focus direction, and/or a tilt direction to form an optical spot at a correct position on the optical disk.

As high density optical disks become popular, the optical pickup and optical pickup actuator tend to be compact and light. In particular, for the optical pickup actuator to perform the recording/reproducing of information with respect to the high density optical disk, 3-axis driving, i.e. driving in the track direction, the focus direction, and the tilt direction, is necessary. Also, to make the optical pickup compact and light, the size of the optical pickup actuator needs to be small. Accordingly, an optical pickup actuator using a fine pattern coil capable of driving in three axes is needed.

FIGS. 1-3 illustrates a conventional optical pickup actuator using a fine pattern coil. As shown in FIG. 1, the conventional optical pickup actuator includes a base 1, a blade 5 supported by a suspension 3 and installed on the base 1 to be capable of moving, a magnetic circuit 10 dividedly installed on the blade 5 and the base 1, and a stopper 9 restricting a driving height during the driving of the blade 5.

An objective lens 7 is installed on the blade 5. As the blade 5 is driven by a driving force through the magnetic circuit 10, the objective lens 7 is driven in the track direction, the focus direction, and the tilt direction.

Thus, the magnetic circuit 10 includes a fine pattern coil 11 fixed to the blade 5, a pair of magnets 15 arranged to face each other with respect to the fine pattern coil 11 interposed therebetween, and a yoke 17 fixing the magnet 15 to the base 1 and forming a magnetic path. The magnets 15 are 2-pole magnetized permanent magnets. In FIGS. 1-3, the magnets 15 are illustrated as being surface polarized to the left and right.

The fine pattern coil 11 is divided into focus coils 12a and 12b and a track coil 13 according to the direction to drive the blade 5. The focus coil includes first and second focus coils 12a and 12b which are separated from a polarization line 15a of the magnet 15 that is polarized to the left and right. Thus, when current is applied, the focus coils 12a and 12b make the fine pattern coil 11 and the blade 5 driven in a Y-axis direction. To this end, the first and second focus coils 12a and 12b are arranged such that a part of the focus coils 12a and 12b parallel to the X-axis direction faces the magnet 15, and contribute to the driving in the focus direction. Thus, the other part (the lower portion in the drawing) of the focus coils 12a and 12b does not face the magnet 15 to prevent the offset of a driving force.

The track coil 13 is arranged in front of the polarization line 15a of the magnet 15 and drives the blade 5 in the X-axis direction when current is applied to the track coil 13. The track coil 13 is arranged such that a part of the track coil 13 parallel to a Y-axis direction faces the magnet 15, and contribute to the driving in the tracking direction.

In the conventional optical pickup actuator using a fine pattern coil configured as above, as shown in FIG. 3, when magnetic poles of the magnet 15 are arranged, an N pole and an S pole are respectively arranged in the left and right sides with respect to the polarization line 15a. When current is applied to the focus coils 12a and 12b in a direction indicated by arrows (→), the blade 5 is driven in a direction indicated by arrow (→).

In the above conventional optical pickup actuator, tilt driving is performed, not by including an additional tilt coil, but instead by using the first and second focus coils 12a and 12b. That is, input/output ports of current with respect to each of the first and second focus coils 12a and 12b are independently configured. Current of a different direction or intensity is applied to the input/output ports. Thus, the focus driving and tilt driving are performed using a difference in the driving forces.

Thus, since the conventional optical pickup actuator includes a structure to perform both focus driving and tilt driving using the first and second focus coils 12a and 12b, a drive circuit is complicated and a correction error may be generated when the driving to correct a focus error and the driving to correct a tilt error are simultaneously performed. Also, in the arrangement of the first and second focus coils 12a and 12b and the magnet 15, since only the upper portions of the first and second focus coils 12a and 12b are used, a magnetic force is weak.

SUMMARY OF THE INVENTION

Accordingly, it is an aspect of the present invention to provide an optical actuator using a fine pattern coil which increases a magnetic driving force by improving the arrangement structure between the focus coil and the magnet and reduce a drive error by configuring an independent tilt coil.

Additional aspects and/or advantages of the invention will be set forth in part in the description which follows and, in part, will be apparent from the description, or may be learned by practice of the invention.

The foregoing and/or other aspects of the present invention are achieved by providing an optical pickup actuator including a base, a blade having an objective lens mounted thereon, a plurality of suspensions supporting the blade to be movable with respect to the base and providing an electroconductive path, and a magnetic circuit driving the blade according to a driving signal applied through the respective suspensions, wherein the magnetic circuit includes a magnet fixed to the base, and a fine pattern coil installed on the blade at a position facing the magnet, and having a track pattern coil, a focus pattern coil, and a tilt pattern coil, independently driven by current applied through the suspensions and providing driving forces in a track direction, a focus direction, and a tilt direction of the blade.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
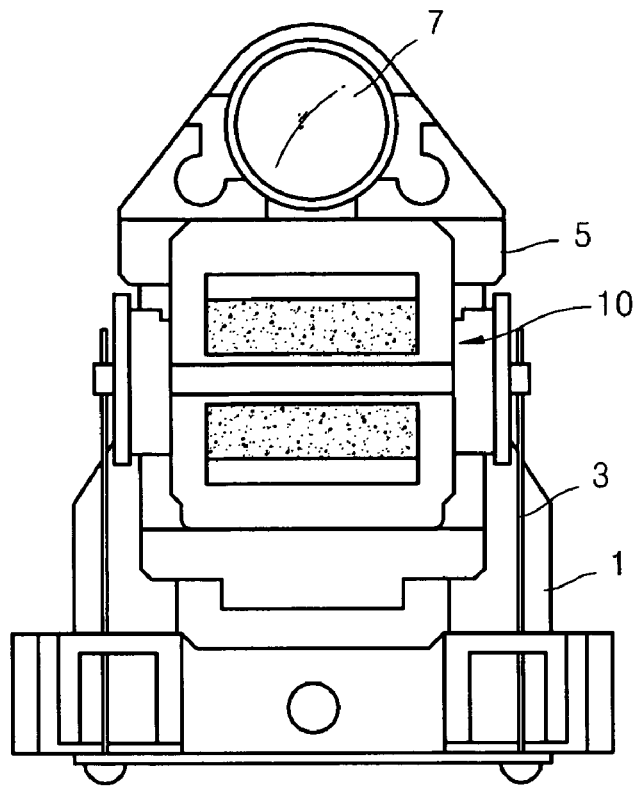
FIG. 1 is a plan view of a conventional optical pickup actuator.
Figure 2:
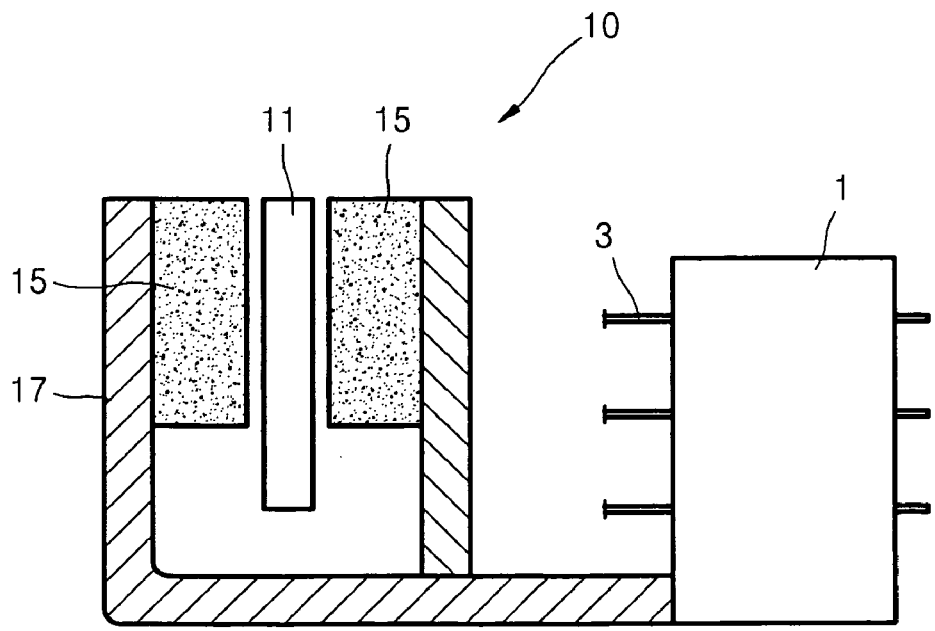
FIG. 2 is a cross-sectional view of a part of the conventional optical pickup actuator of FIG. 1.
Figure 3:
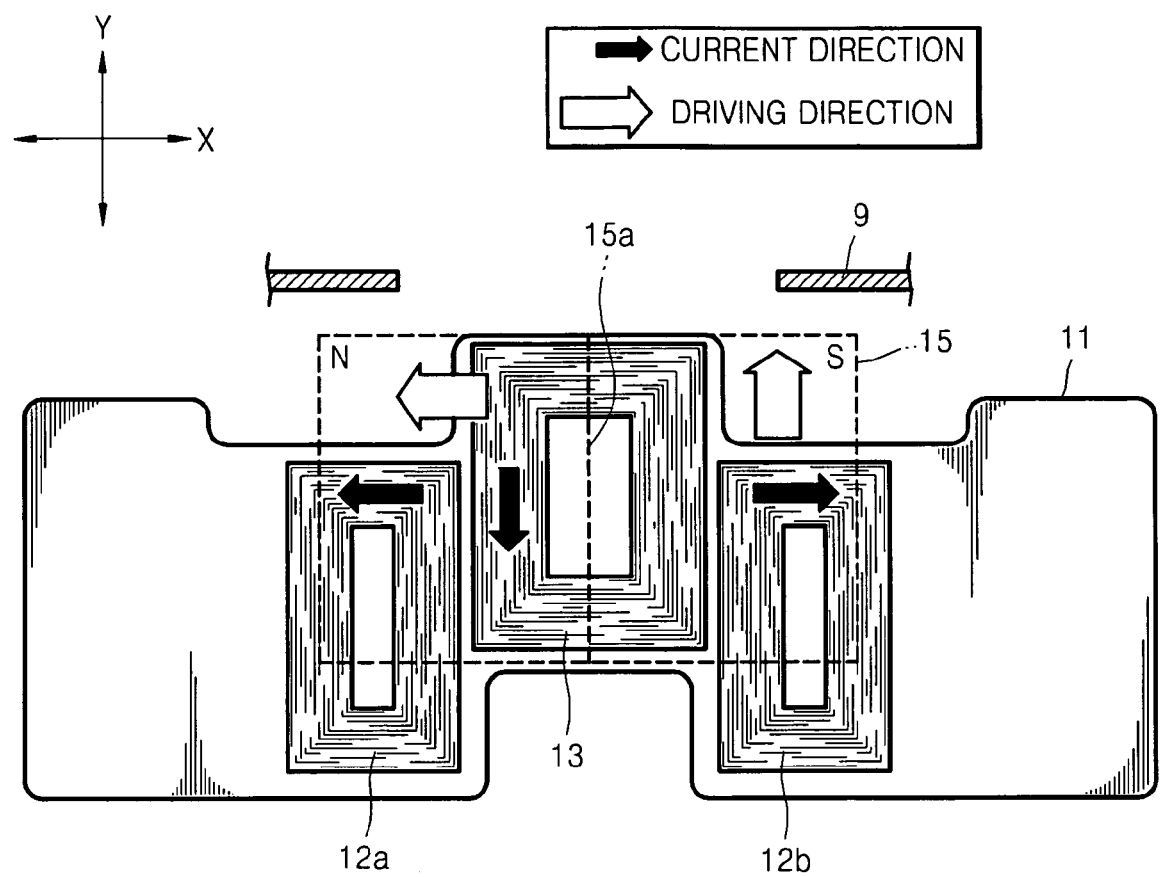
FIG. 3 is a view of the arrangement of the fine pattern coil and the magnet of the conventional optical pickup actuator shown in FIG. 1 and a driving direction according to the direction of current.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
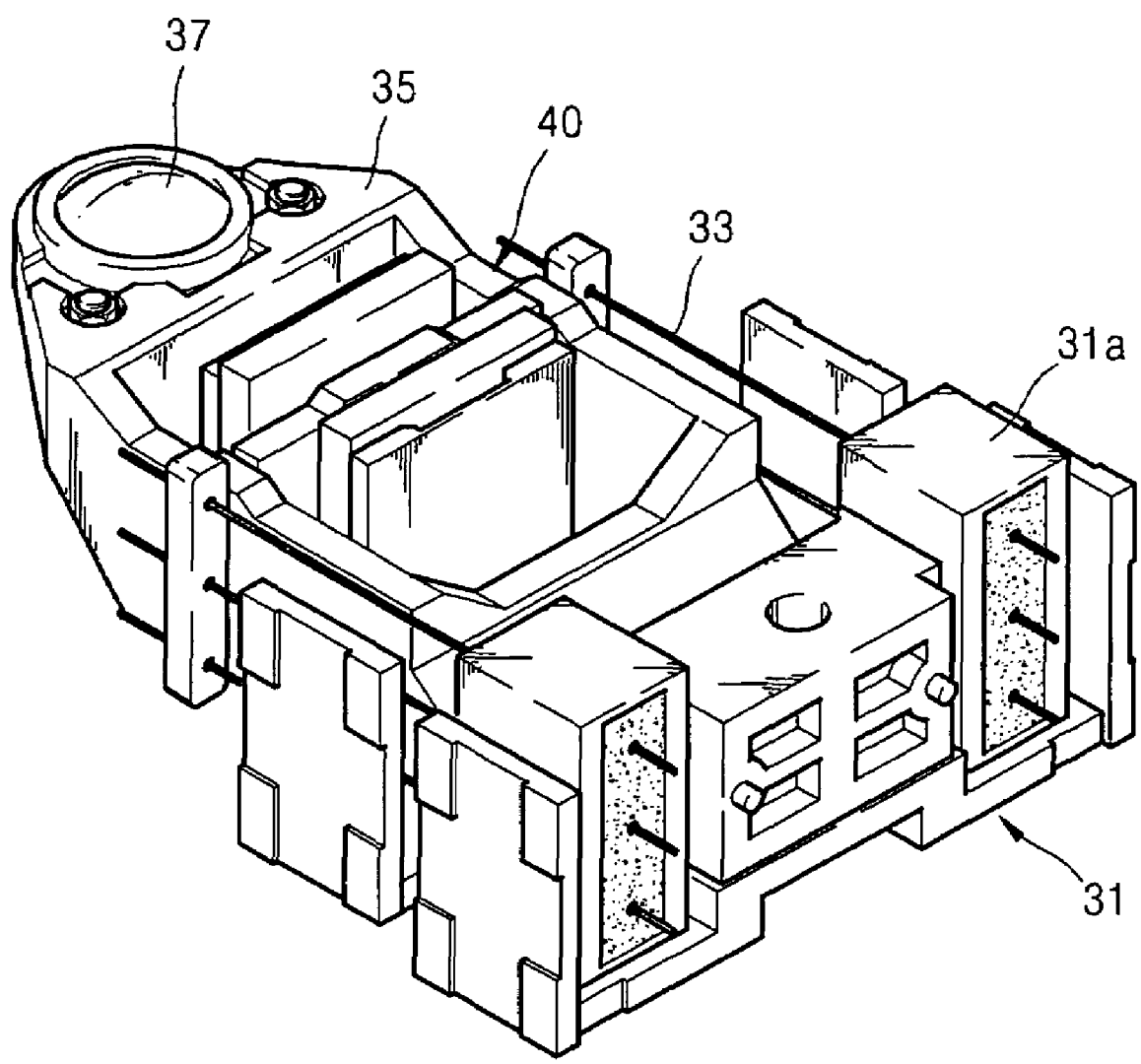
FIG. 4 is a perspective view of an optical pickup actuator according to an embodiment of the present invention.
Figure 5:
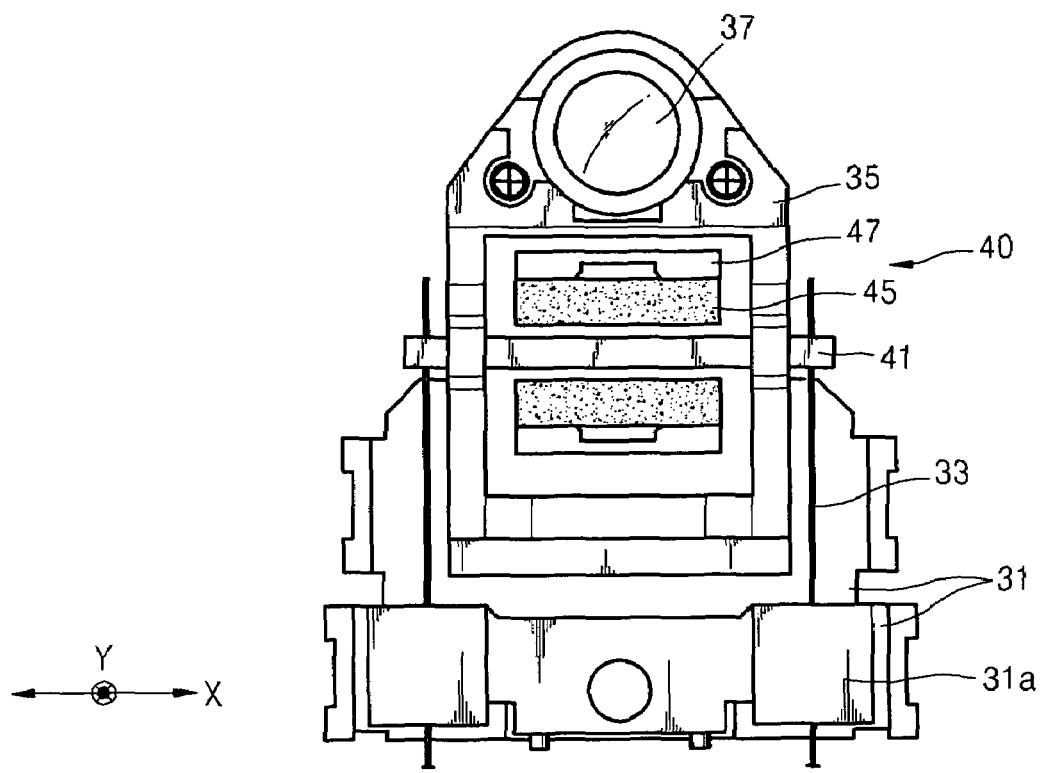
FIG. 5 is a plan view of the optical pickup actuator of FIG. 4.
Figure 6:
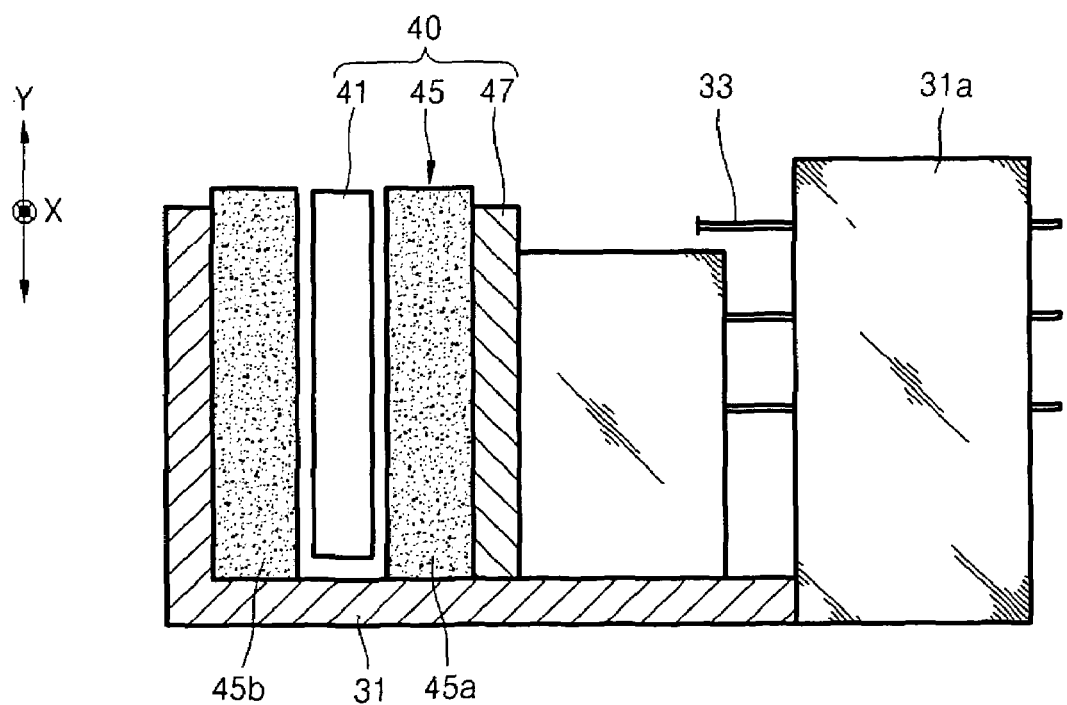
FIG. 6 is a cross-sectional view of a part of the optical pickup actuator of FIG. 4.

FIGS. 4 and 5 are a perspective view and a plan view of an optical pickup actuator according to an embodiment of the present invention. FIG. 6 is a cross-sectional view of a major part of the optical pickup actuator of FIG. 4. As shown in FIGS. 4-6, an optical pickup actuator according to an embodiment of the present invention comprises a base 31, a blade 35 on which an objective lens 37 is mounted, a plurality of suspensions 33 supporting the blade 35 to be movable with respect to the base 31, and a magnetic circuit 40 driving the blade 35. The suspensions 33 provide electroconductive paths through which current is applied to a fine pattern coil 41 which constitutes the magnetic circuit 40. Thus, in this embodiment of the present invention, the suspensions 33 are six suspension wires, for example, as shown in FIG. 4. However, the present invention is not limited hereto, and may vary as necessary.

The base 31 is installed to be movable in a radial direction of an optical recording medium with respect to an optical information recording/reproducing apparatus. The base 31 comprises a holder 31a to support an end of the suspensions 33. As the blade 35 is operated by a driving force through the magnetic circuit 40, the objective lens 37 is independently driven in a track direction, a focus direction, and a tilt direction (i.e., 3-axis driving).

Thus, the magnetic circuit 40 comprises a magnet 45 fixed to the base 31 and a fine pattern coil 41 installed at a position facing the magnet 45 of the blade 35. According to an embodiment of the present invention, the fine pattern coil 41 is directly formed on the blade 35 by insert molding or assembly, for example. As the fine pattern coil 41 is formed as described later, an electrode 410 of FIG. 10 and the suspensions 33 can be directly and electrically connected.

The magnet 45 comprises first and second magnets 45a and 45b arranged to face each other with respect to the fine pattern coil 41 interposed therebetween. In this case, since a magnetic driving force between the fine pattern coil 41 and the magnet 45 is increased, more accurate driving control is available. Further, a yoke 47 which fixes the magnet 45 to the base 31 and forms a magnetic path is provided. The arrangement of magnetic poles of the magnet 45 according to an embodiment of the present invention will be described with reference to FIGS. 7-9.

Figure 7:
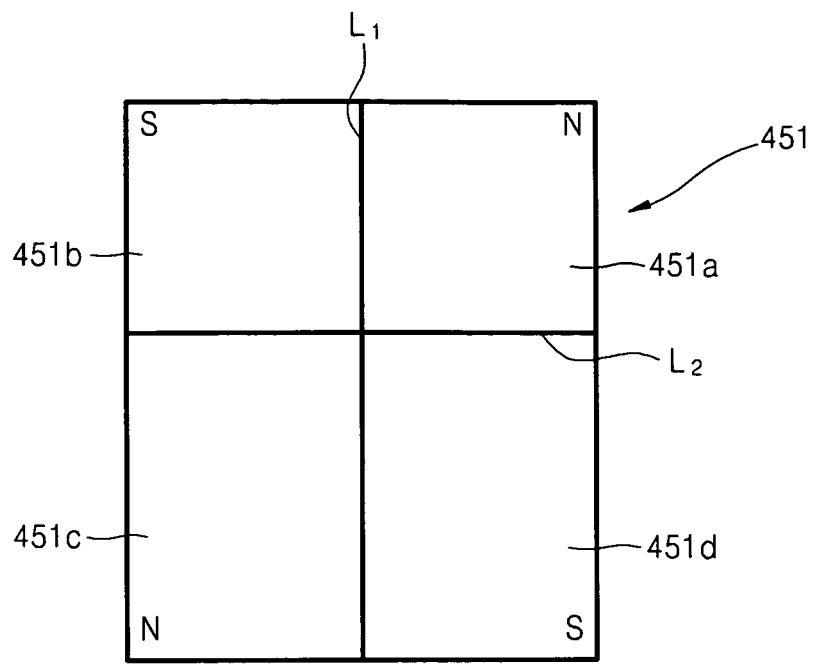
FIGS. 7-9 are views illustrating the arrangements of magnetic poles of magnets according to embodiments of the present invention.

FIG. 7 is a view illustrating the arrangement of magnetic poles of a magnet according to an embodiment of the present invention. As shown in FIG. 7, a magnet 451, according to an embodiment of the present invention, is a magnet which is 4-pole magnetized and surface divided for example. That is, the magnet 451 has a 2×2 format and is sectioned in a cross type along a first polarization line $L_1$ parallel to the focus driving direction (Y direction) of the blade 35 and a second polarization line $L_2$ parallel to a track driving direction (X direction) of the blade 35. The magnet 451 comprises first through fourth magnet portions 451a, 451b, 451c, and 451d respectively arranged in the first through fourth quadrants. The neighboring magnet portions are polarized to have the opposite poles. For example, in the first and third magnet portions 451a and 451c, N poles face the fine pattern coil 41 while, in the second and fourth magnet portions 451b and 451d, S poles face the fine pattern coil 41. The present invention is not limited hereto, and may vary as necessary.

The above arrangement of the magnet 451 is an example of one of two magnets arranged to face each other. Accordingly, the other magnet has the same sectional structure but the opposite magnetic pole arrangement. For example, when the magnetic pole arrangement of the magnet 451 is that of a portion of the first magnet 45a of FIG. 6 facing the fine pattern coil 41, in the magnetic pole arrangement of a portion of the second magnet 45b of FIG. 6 facing the fine pattern coil 41, the magnet portions facing the first and third magnet portions 451a and 451c are S poles while the magnet portions facing the second and fourth magnet portions 451b and 451d are N poles.

When the first through fourth magnet portions 451a, 451b, 451c, and 451d are arranged as above, since an interval space between the respective magnet portions is not formed, the base 31 is easily assembled.

Figure 8:
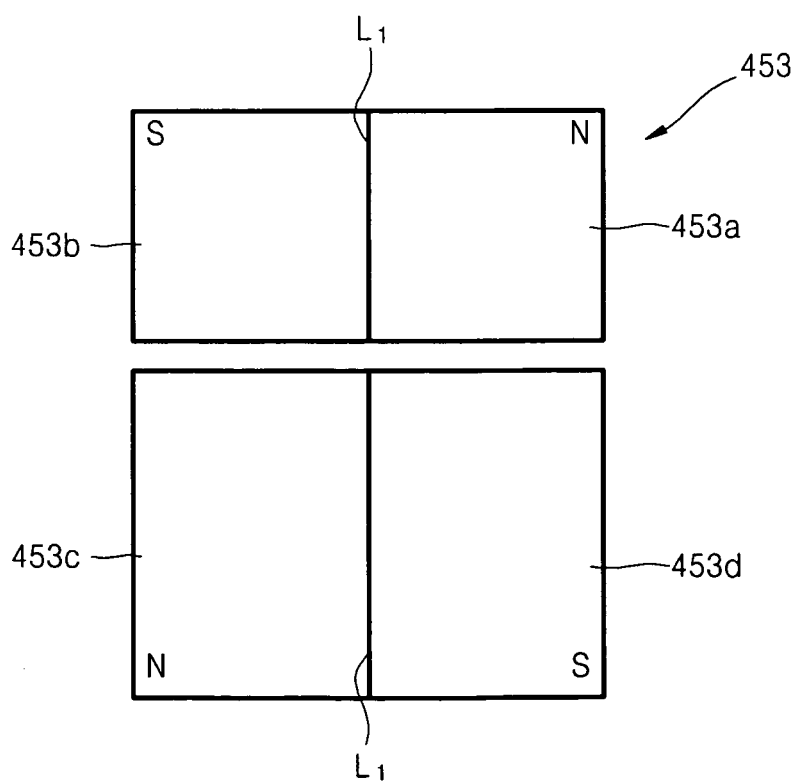

FIG. 8 is a view illustrating the arrangement of magnetic poles of a magnet according to another embodiment of the present invention. As shown in FIG. 8, a magnet 453 according to an embodiment of the present invention is two magnets, each of which is 2-pole magnetized and surface divided, for example. The magnet 453 comprises first through fourth magnet portions 453a, 453b, 453c, and 453d. The first and second magnet portions 453a and 453b are arranged close to each other and the magnetic poles thereof are polarized to be opposite to each other with respect to the first polarization line $L_1$ that is parallel to the focus driving direction (Y direction) of the blade 35. The third and fourth magnet portions 453c and 453d are arranged close to each other and the magnetic poles thereof are polarized to be opposite to each other with respect to the first polarization line $L_1$. The third and fourth magnet portions 453c and 453d are respectively separated a predetermined distance from the second and first magnet portions 453b and 453a in the focus direction (Y) of the blade 35. Also, the first and fourth magnet portions 453a and 453d have the opposite magnetic poles while the second and third magnetic portions 453b and 453c have the opposite magnetic poles. For example, the first and third magnetic portions 453a and 453c have N poles to face the fine pattern coil 41 while the second and fourth magnetic portions 453b and 453d have S poles to face the fine pattern coil 41.

The above arrangement of the magnet 453 is an example of one of two magnets arranged to face each other. Accordingly, the other magnet has the same sectional structure but the opposite magnetic pole arrangement. In this embodiment of the present invention, since the gap between the magnetic portions in the focus direction is larger than that FIG. 7, the driving force in the focus direction can be improved.

Figure 9:
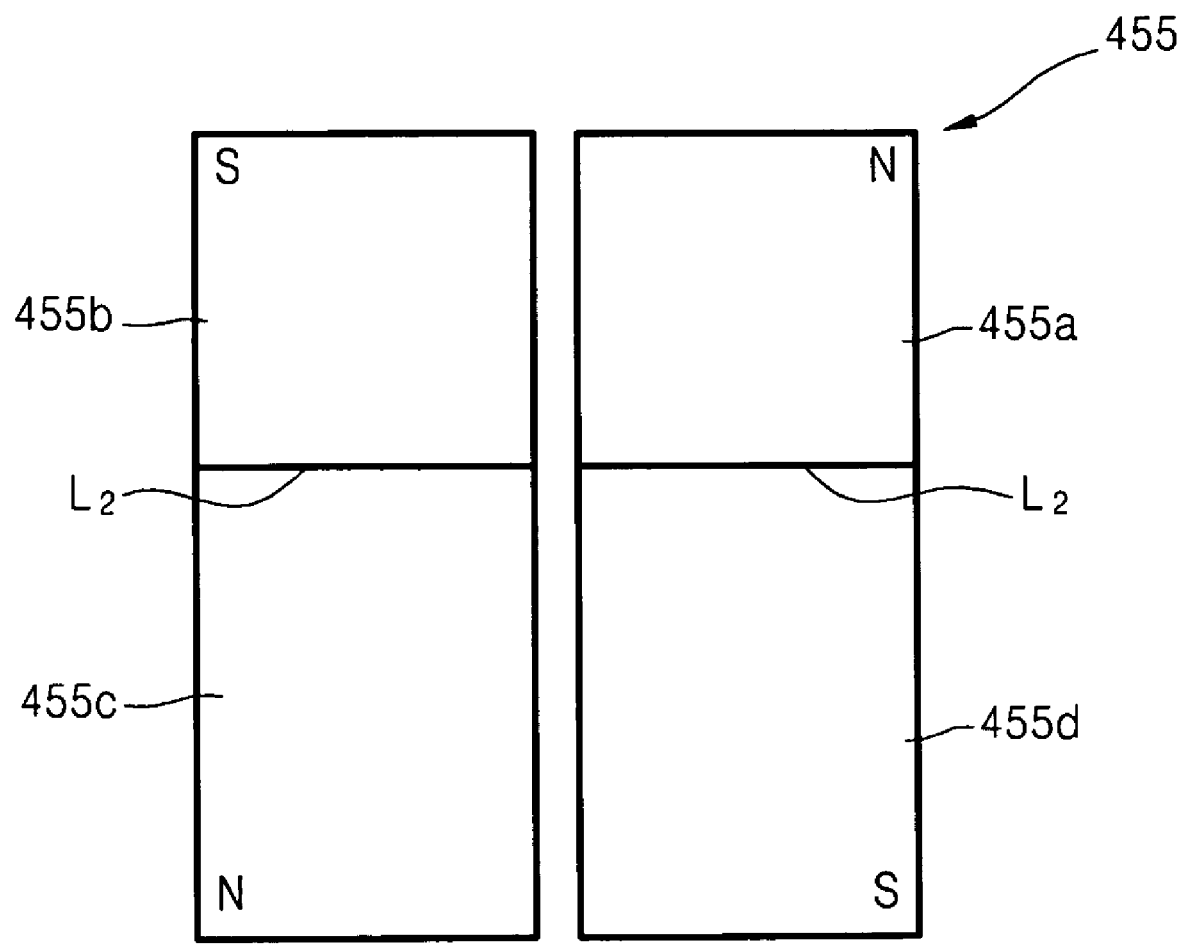

FIG. 9 is a view illustrating the arrangement of the magnetic poles of a magnet according to yet another embodiment of the present invention. As shown in FIG. 9, a magnet 455 according to yet another embodiment of the present invention comprises two magnets, each of which is 2-pole magnetized and surface divided, for example. The magnet 455 comprises first through fourth magnet portions 455a, 455b, 455c, and 455d. The first and fourth magnet portions 455a and 455d are arranged close to each other and the magnetic poles thereof are polarized to be opposite to each other with respect to the second polarization line $L_2$ that is parallel to the track driving direction (X direction) of the blade 35. The second and third magnet portions 455b and 455c are arranged close to each other and the magnetic poles thereof are polarized to be opposite to each other with respect to the second polarization line $L_2$. The second and third magnet portions 455b and 455c are respectively separated a predetermined distance from the first and fourth magnet portions 455a and 455d in the track direction (X) of the blade 35. Also, the first and second magnet portions 455a and 455b have the opposite magnetic poles while the third and fourth magnetic portions 455c and 455d have the opposite magnetic poles. For example, the first and third magnetic portions 455a and 455c have N poles to face the fine pattern coil 41 while the second and fourth magnetic portions 455b and 455d have S poles to face the fine pattern coil 41.

The above arrangement of the magnet 455 is an example of one of two magnets arranged to face each other. Accordingly, the other magnet has the same sectional structure but the opposite magnetic pole arrangement. In this case, since the gap between the magnet portions in the track direction is larger than that of FIG. 7, the driving force in the focus direction can be improved.

Figure 10:
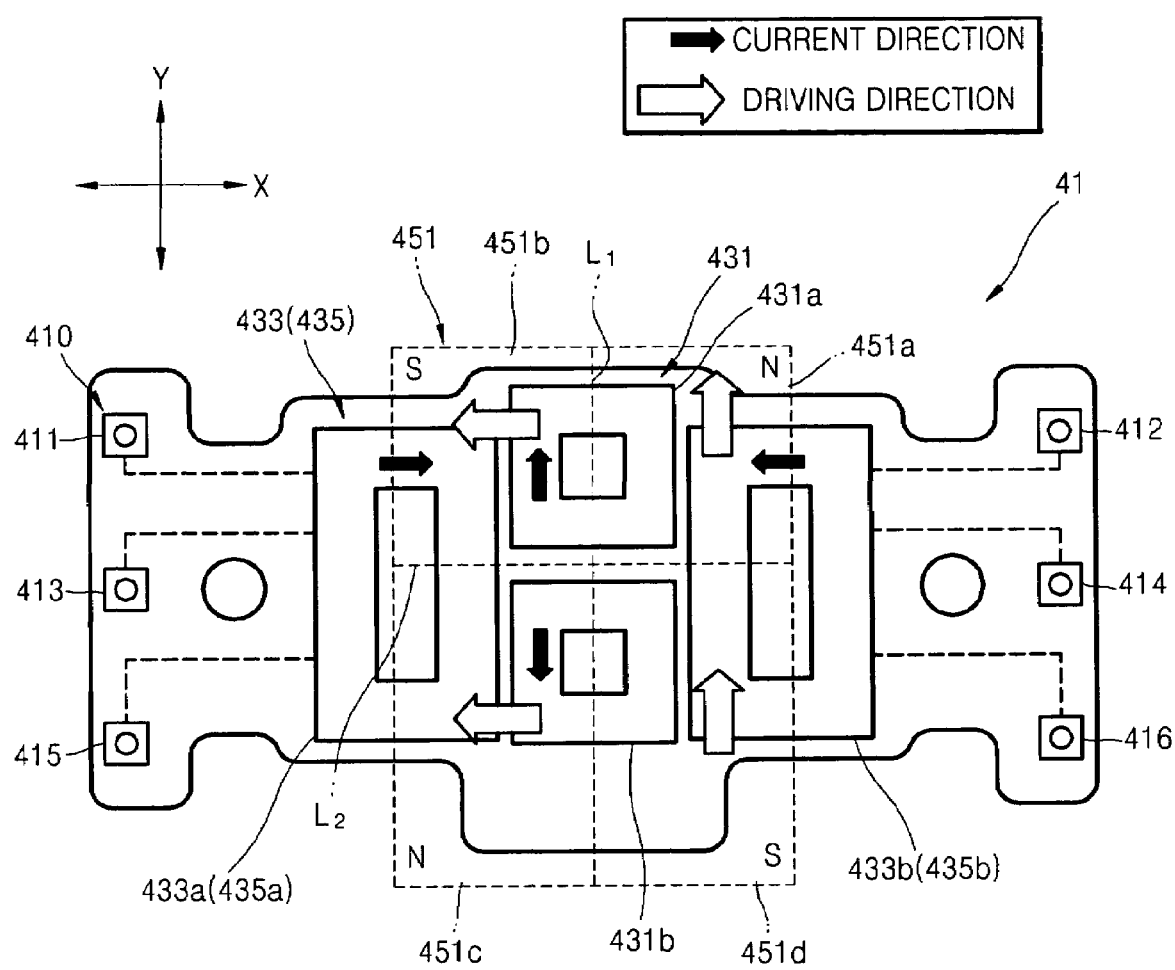
FIG. 10 is a view illustrating the arrangement of the fine pattern coil and the magnet of FIG. 4 and a driving direction according to the direction of current.
Figure 11A:
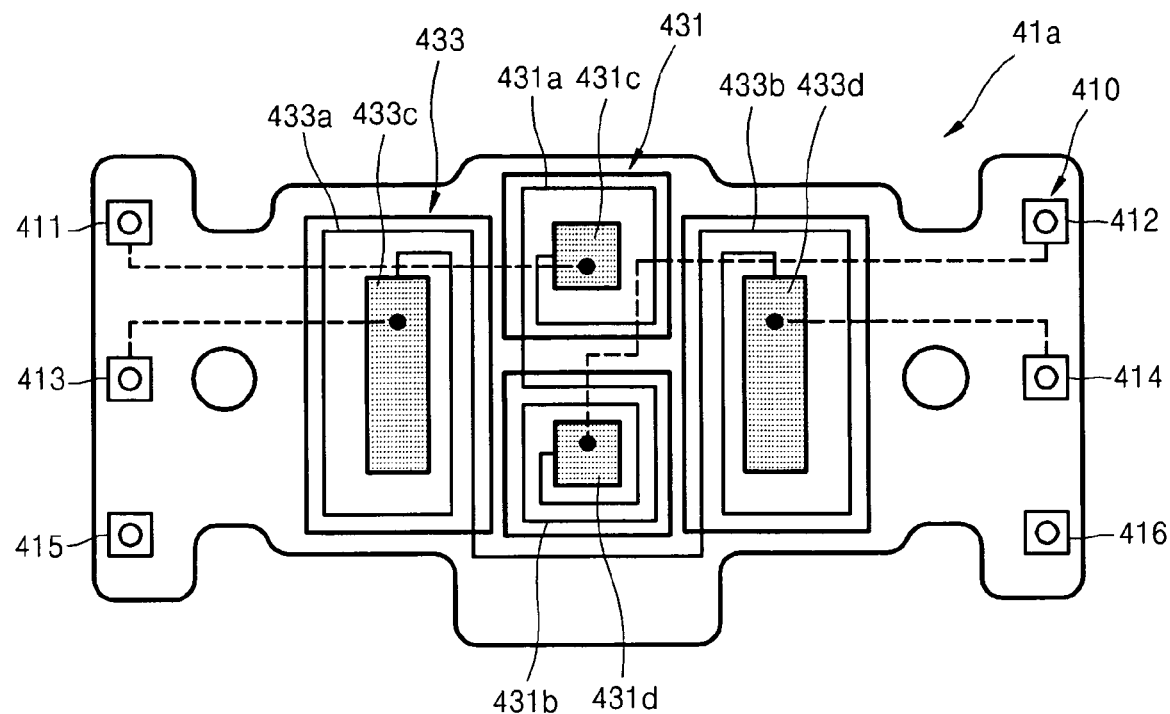
FIGS. 11A and 11B are view illustrating the arrangements of coils and electrodes on different layers of the fine pattern coil.
Figure 11B:
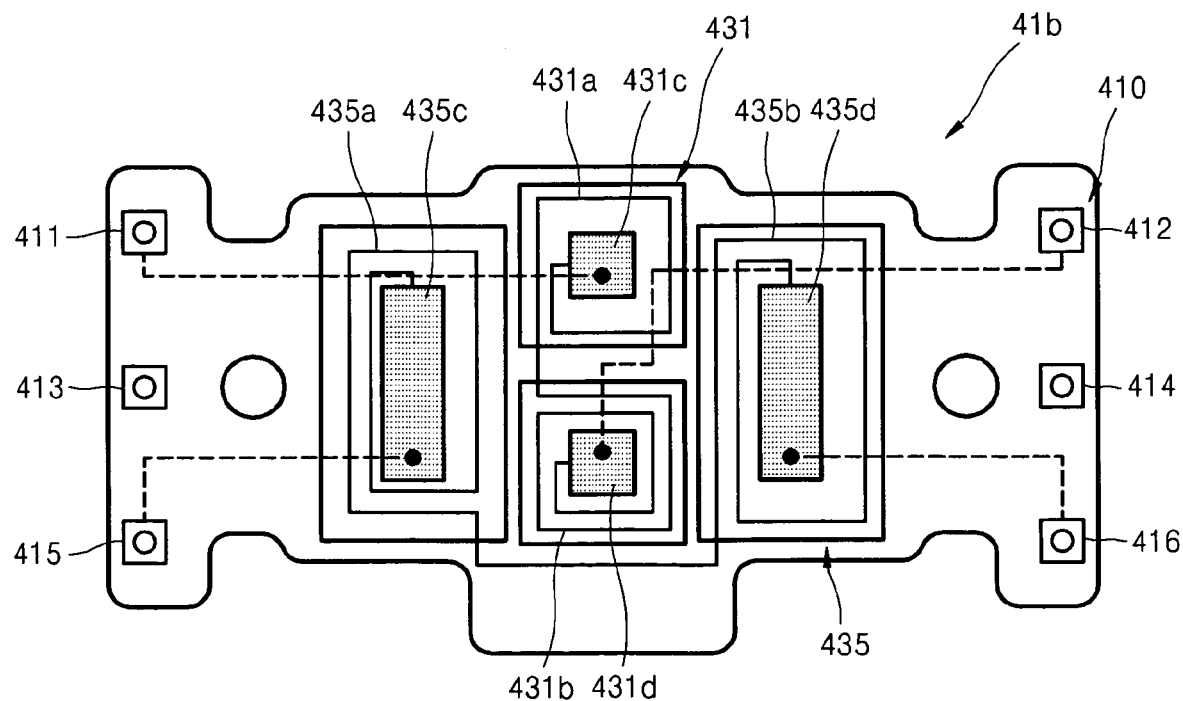

FIG. 10 is a view illustrating the arrangement of the fine pattern coil 41 and the magnet 451 of FIG. 7 and a driving direction according to the direction of current. FIGS. 11A and 11B are view illustrating the arrangements of coils and electrodes on different layers of the fine pattern coil. As shown in FIGS. 10, 11a and 11B, the structure of the fine pattern coil 41 and the interaction between the magnets and the fine pattern coil 41 will be described in detail.

As shown in FIGS. 10, 11A, and 11B, the fine pattern coil 41 is independently driven by current applied through the suspensions 33 and comprises a track pattern coil 431, a focus pattern coil 433, and a tilt pattern coil 435 respectively providing driving force in the track direction (X axis), the focus direction (Y axis), and the tilt direction of the blade 35.

The fine pattern coil 41 comprises a stacked structure of at least two pattern coil layers that are electrically insulated. A plurality of electrodes 410 electrically connected with the respective suspensions 33 of FIG. 4 are formed at positions corresponding to the respective fine pattern coil layers. As shown in FIG. 10, the electrode 410 comprises first through sixth electrodes 411-416 which are electrically connected with both of the respective suspensions 33 and the fine pattern coil 41. That is, the first and second electrodes 411 and 412 are electrically connected with the track pattern coil 431, the third and fourth electrodes 413 and 414 are electrically connected with the focus pattern coil 433, and the fifth and sixth electrodes 415 and 416 are electrically connected with the tilt pattern coil 435. Thus, by applying current independently to each of the first through sixth electrodes 411-416, the track pattern coil 431, the focus pattern coil 433, and the tilt pattern coil 435 can be selectively and independently driven.

FIGS. 11A and 11B illustrate an example in which the fine pattern coil 41 includes first and second pattern coil layers 41a and 41b. As shown in FIG. 11A, the first through sixth electrodes 411-416 connected with the suspensions 33 of FIG. 4, the track pattern coil 431 electrically connected with the first and second electrodes 411 and 412, and the focus pattern coil 433 electrically connected with the third and fourth electrodes 413 and 414 are formed on the first pattern coil layer 41a. As shown in FIG. 11B, the first through sixth electrodes 411-416 connected with the suspensions 33 of FIG. 4, the track pattern coil 431 electrically connected with the first and second electrodes 411 and 412, and the tilt pattern coil 435 electrically connected with the fifth and sixth electrodes 415 and 416 are formed on the second pattern coil layer 41b.

Since the first through sixth electrodes 411-416 and the track pattern coil 431 formed on the first and second pattern coil layers 41a and 41b have substantially the same structure and perform the same function, thus, the same reference numerals are used. That is, since the first through sixth electrodes 411-416 of the first pattern coil layer 41a are electrically connected with the first through sixth electrodes 411-416 of the second pattern coil layer 41b, respectively, when current is applied through the suspensions 33 of FIG. 4, a driving force is generated by an interactive electromagnetic force between the track, focus, and tilt pattern coils 431, 433, and 435 and the magnet 45.

Also, the track pattern coils 431 formed on the first and second pattern coil layers 41a and 41b are arranged to face each other when the fine pattern coil 41 is formed by depositing the first and second pattern coil layers 41a and 41b, and the portions facing each other are wound in a same rotation direction.

The track pattern coil 431 comprises first and second track pattern coil portions 431a and 431b. The first track pattern coil portion 431a is electrically connected with the first electrode 411 through a first port 431c. When the magnet 451 configured as shown in FIG. 7 is provided, the first track pattern coil portion 431a is arranged to face each of the first and second magnet portions 451a and 451b. That is, each of two parts of the first track pattern coil portion 431a parallel to the Y axis is arranged at a different position with respect to the first polarization line $L_1$.

The second track pattern coil portion 431b is electrically connected with the second electrode 412 through a second port 431d. Also, the first port 431c and the second port 431d are electrically connected with each other. When the magnet 451 configured as shown in FIG. 7 is provided, the second track pattern coil portion 431b is arranged to face each of the third and fourth magnet portions 451c and 451d. That is, each of two parts of the second track pattern coil portion 431b parallel to the Y axis is arranged at a different position with respect to the first polarization line $L_1$.

Also, the second track pattern coil portion 431b is wound in a direction opposite to a direction in which a coil of the first track pattern coil portion 431a is wound. Thus, as shown in FIG. 10, when current is applied clockwise to the first track pattern coil portion 431a, the current is applied counterclockwise to the second track pattern coil portion 431b. The magnetic poles of the magnet 451 respectively facing the first and second track pattern coil portions 431a and 431b are provided opposite to each other. Thus, the current is applied to the first track pattern coil portion 431a in a direction indicated by an arrow "↑" and to the second track pattern coil portion 431b in a direction indicated by an arrow "↓", the blade 35 of FIG. 4 is driven in a track direction indicated by an arrow "←", that is, in a direction −X axis. Reversely, when the current is applied in a direction opposite to the direction shown in FIG. 10, the blade 35 is driven in the +X axis direction according to the above-described principle.

Thus, the driving of the blade 35 and the objective lens 37 mounted thereon in the track direction can be performed by the direction of the current applied to the first and second track pattern coil portions 431a and 431b and an interactive electromagnetic force between the first through fourth magnet portions 451a, 451b, 451c, and 451d.

The focus pattern coil 433 and the tilt pattern coil 435 formed on each of the first and second pattern coil layers 41a and 41b are arranged to face to each other by depositing the first and second pattern coil layers 41a and 41b when the fine pattern coil 41 is formed. At least part of the portions facing each other is wound in a different rotation direction.

As shown in FIG. 11A, the focus pattern coil 433 comprises first and second focus pattern coil portions 433a and 433b which are arranged at both side positions with respect to the track pattern coil 431 interposed therebetween. The first focus pattern coil portion 433a is electrically connected with the third electrode 413 through a third port 433c. As shown in FIG. 10, when the magnet 451 configured as shown in FIG. 7 is provided, at least part of the first focus pattern coil portion 433a is arranged to face each of the second and third magnet portions 451b and 451c. That is, each of two portions of the first focus pattern coil portion 433a parallel to the X axis is arranged at a different position with respect to the second polarization line $L_2$.

The second focus pattern coil portion 433b is electrically connected with the fourth electrode 414 through a fourth port 433d. The third port 433c and the fourth port 433d are electrically connected with each other. When the magnet 451 configured as shown in FIG. 7 is provided, at least part of the second focus pattern coil portion 433b is arranged to face each of the first and fourth magnet portions 451a and 451d. That is, each of the two portions of the second focus pattern coil portion 433b parallel to the X axis is arranged at a different position with respect to the second polarization line $L_2$.

Also, the second focus pattern coil portion 433b is wound in a direction opposite to a direction in which a coil of the first focus pattern coil portion 433a is wound. Thus, as shown in FIG. 10, when current is applied clockwise to the first focus pattern coil portion 433a, the current is applied counterclockwise to the second focus pattern coil portion 433b. The magnetic poles of the magnet 451 respectively facing the first and second focus pattern coil portions 433a and 433b are provided opposite to each other. Thus, the current is applied to the first focus pattern coil portion 433a in a direction indicated by an arrow "→" and to the second focus pattern coil portion 433b in a direction indicated by an arrow "←", the blade 35 of FIG. 4 is driven in a focus direction indicated by an arrow "↑", that is, in a direction +Y axis. Reversely, when the current is applied in the opposite direction, the blade 35 is driven in the −Y axis direction according to the same principle.

Thus, the driving of the blade 35 and the objective lens 37 mounted thereon in the focus direction can be performed by the direction of the current applied to the first and second focus pattern coil portions 433a and 433b and the interactive electromagnetic force between the first through fourth magnet portions 451a, 451b, 451c, and 451d.

As shown in FIG. 11B, the tilt pattern coil 435 comprises first and second tilt pattern coil portions 435a and 435b which are arranged at both side positions with respect to the track pattern coil 431 interposed therebetween. The first tilt pattern coil portion 435a is electrically connected with the fifth electrode 415 through a fifth port 435c. When the magnet 451 configured as shown in FIG. 7 is provided, at least part of the first tilt pattern coil portion 435a is arranged to face each of the second and third magnet portions 451b and 451c. That is, each of two portions of the first tilt pattern coil portion 435a parallel to the X axis is arranged at a different position with respect to the second polarization line $L_2$.

The second tilt pattern coil portion 435b is electrically connected with the sixth electrode 416 through a sixth port 435d. The fifth port 435c and the sixth port 435d are electrically connected with each other. When the magnet 451 configured as shown in FIG. 7 is provided, at least part of the second tilt pattern coil portion 435b is arranged to face each of the first and fourth magnet portions 451a and 451d. That is, each of the two portions of the second tilt pattern coil portion 435b parallel to the X axis is arranged at a different position with respect to the second polarization line $L_2$.

Also, the second tilt pattern coil portion 435b is wound in a direction in which a coil of the first tilt pattern coil portion 435a is wound. Thus, as shown in FIG. 10, when current is applied clockwise to the first tilt pattern coil portion 435a, the current is also applied clockwise to the second tilt pattern coil portion 435b unlike the focus pattern coil 433. The magnetic poles of the magnet 451 respectively facing the first and second tilt pattern coil portions 435a and 435b are provided opposite to each other. Thus, when the current is applied to the first tilt pattern coil portion 435a in a direction indicated by an arrow "→", the blade 35 of FIG. 4 is driven in a direction indicated by an arrow "↑", that is, in a direction +Y axis, in a portion corresponding thereto. Meanwhile, the current is applied to the second tilt pattern coil portion 435b in the same direction indicated by the arrow "→". Thus, since in this case the poles of the magnet 45 are arranged to be opposite to each other, the blade 35 of FIG. 4 is driven in a direction indicated by an arrow "↓" (not shown), that is, in the −Y axis direction, in a portion corresponding thereto. Accordingly, the blade 35 is tilt driven in the clockwise direction. Meanwhile, when the current is applied in the opposite direction, the blade 35 is tilt driven in the counterclockwise direction according to the same principle.

Thus, the driving of the blade 35 and the objective lens 37 mounted thereon in the tilt direction can be performed by the direction of the current applied to the first and second tilt pattern coil portions 435a and 435b and the interactive electromagnetic force between the first through fourth magnet portions 451a, 451b, 451c, and 451d.

The fine pattern coil 41 according to the present invention is not limited to the above-described 2-layer deposition structure having the first and second pattern coil layers 41a and 41b, and can have a variety of layer structures, for example, four layers or six layers considering a desired intensity of the magnetic driving force.

As described above, since the optical pickup actuator according to an embodiment of the present invention uses the fine pattern coil, a slim-type optical pickup actuator having a height which is greatly reduced can be provided. Also, since the fine pattern coil is formed in the blade in insert molding or directly assembly, and the suspensions and the fine pattern coil are directly connected without using an additional part such as a print circuit board, mass production and assembly accuracy can be secured.

Furthermore, the structure and arrangement of the magnet are improved so that both the upper and lower portions of the focus pattern coil are involved in the focus driving. Thus, the magnetic driving force in the focus direction can be increased. In addition, since the track pattern coil is formed in the upper and lower portions of the magnet with respect to the second polarization line, an effective coil area contributing to the magnetic driving force in the track driving direction can be extended so that the deterioration of sensitivity performance is prevented and negative oscillation due to a leakage magnetic flux is greatly reduced. In forming the fine pattern coil in a multilayer structure, since an independent fine pattern coil is provided, the tilt driving can be performed, without being affected by the focus driving so that driving error can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup actuator comprising a base, a blade having an objective lens mounted thereon, a plurality of suspensions supporting the blade to be movable with respect to the base and providing an electroconductive path, and a magnetic circuit driving the blade according to a driving signal applied through the respective suspensions,
   wherein the magnetic circuit comprises:
   a magnet fixed with the base; and
   a fine pattern coil installed on the blade at a position facing the magnet, and comprising a track pattern coil, a focus pattern coil, and a tilt pattern coil independently driven by current applied through the suspensions and providing driving forces in a track direction, a focus direction, and a tilt direction of the blade;
   wherein the fine pattern coil comprises first and second fine pattern coil layers which are electrically insulated from each other; and
   wherein the first fine pattern coil layer comprises the track pattern coil and the focus pattern coil and the second fine pattern coil layer comprises the track pattern coil and the tilt pattern coil.

2. The optical pickup actuator of claim 1, wherein the magnet is sectioned by a first polarization line parallel to a focus driving direction of the blade and a second polarization line parallel to a track driving direction of the blade, and being of a 2-2 format which comprises first through fourth magnet portions arranged in first through fourth quadrants, and magnetic poles of neighboring magnet portions are polarized to have the opposite poles.

3. The optical pickup actuator of claim 1, wherein the magnet comprises:
   first and second magnet portions which are arranged close to each other and comprise magnetic poles polarized to be opposite to each other with respect to a first polarization line parallel to a focus driving direction of the blade; and
   third and fourth magnet portions which are arranged close to each other and comprise magnetic poles polarized to be opposite to each other with respect to the first polarization line, and
   the third and fourth magnet portions are separated a predetermined distance in the focus driving direction of the blade from the second and first magnet portions, respectively, and comprise magnetic poles that are opposite to those of the second and first magnets.

4. The optical pickup actuator of claim 1, wherein the magnet comprises:
   first and fourth magnet portions which are arranged close to each other and comprise magnetic poles polarized to be opposite to each other with respect to a second polarization line parallel to a track driving direction of the blade; and
   second and third magnet portions which are arranged close to each other and comprise magnetic poles polarized to be opposite to each other with respect to the second polarization line, and
   the second and third magnet portions are separated a predetermined distance in the track driving direction of the blade from the first and fourth magnet portions, respectively, and have magnetic poles that are opposite to those of the first and fourth magnets.

5. The optical pickup actuator of claim 1, further comprising a yoke which fixes the magnet to the base and forms a magnetic path.

6. The optical pickup actuator of claim 1, wherein the magnet comprises first and second magnets arranged to face each other with respect to the fine pattern coil interposed therebetween.

7. The optical pickup actuator of claim 2, wherein the fine pattern coil further comprises:
   a plurality of electrodes electrically connected with the respective suspensions formed on each of the first and second fine pattern coil layers at positions corresponding thereto.

8. The optical pickup actuator of claim 7, wherein
   the, track pattern coil is electrically connected with first and second electrodes of the plurality of electrodes, the focus pattern coil is electrically connected with third and fourth electrodes of the plurality of electrodes; and the tilt pattern coil is electrically connected with fifth and sixth electrodes of the plurality of electrodes.

9. The optical pickup actuator of claim 8, wherein the track pattern coil comprises first and second track pattern coil portions and wherein the first and second track pattern coil portions are formed on the first and second fine pattern coil layers and are arranged to face each other when the fine pattern coil is formed by depositing the first and second fine pattern coil layers, and the track pattern coil portions facing to each other are wound in a same rotation direction.

10. The optical pickup actuator of claim 9, wherein
   the first track pattern coil portion is electrically connected with the first electrode and arranged to face the first and second magnet portions; and
   the second track pattern coil portion is electrically connected with the first track pattern coil portion and the second electrode and arranged to face the third and fourth magnet portions,
   wherein driving of the blade in the track direction is performed by a direction of current applied to the first and second track pattern coil portions and an interactive electromagnetic force between the first through fourth magnet portions.

11. The optical pickup actuator of claim 8, wherein the focus pattern coil and the tilt pattern coil formed on each of the first and second pattern coil layers are arranged to face each other when the fine pattern coil is formed by depositing the first and second pattern coil layers, and portions of the focus pattern coil and the tilt pattern coil facing to each other are wound in a same rotation direction.

12. The optical pickup actuator of claim 11, wherein the focus pattern coil comprises: first and second focus pattern coil portions arranged at both side positions with respect to the track pattern coil interposed therebetween, the first focus pattern coil portion is electrically connected with the third electrode and arranged to face the second and third magnet portions to interact each other, and the second focus pattern coil portion is electrically connected with the first focus pattern coil portion and the fourth electrode and arranged to face the second and third magnet portions to interact each other.

13. The optical pickup actuator of claim 12, wherein the first focus pattern coil portion and the second focus pattern coil portion are wound in opposite rotation directions.

14. The optical pickup actuator of claim 11, wherein the tilt pattern coil comprises first and second tilt pattern coil portions arranged at both side positions with respect to the track pattern coil interposed therebetween, the first tilt pattern coil portion is electrically connected with the fifth electrode and arranged to face the second and third magnet portions to interact each other, and the second tilt pattern coil portion is electrically connected to the first tilt pattern coil portion and the sixth electrode and arranged to face the first and fourth magnet portions to interact each other.

15. The optical pickup actuator of claim 14, wherein the tilt focus pattern coil portion and the second tilt pattern coil portion are wound in a same rotation direction.

16. An optical pickup actuator comprising:
a base;
a blade having an objective lens mounted thereon;
a plurality of suspensions supporting the blade to be movable with respect to the base and providing an electro-conductive path; and
a magnetic circuit to drive the blade, comprising:
    a magnet fixed with the base, and
    a fine pattern coil installed at a position facing the magnet and formed directly on the blade and comprising a track pattern coil, a focus pattern coil, and a tilt pattern coil, independently driven by current supplied through the suspensions;
wherein the fine pattern coil comprises first and second fine pattern coil layers which are electrically insulated from each other; and
wherein the first fine pattern coil layer comprises the track pattern coil and the focus pattern coil and the second fine pattern coil layer comprises the track pattern coil and the tilt pattern coil.

17. The optical pickup actuator of claim 16, wherein the base is installed to be movable in a radial direction of an optical recording medium and comprises a holder to support an end of the suspensions, such that as the blade is operated by a driving force through the magnetic circuit, the objective lens is independently driving in a track direction, a focus direction and a tilt direction.

18. The optical pickup actuator of claim 16, wherein the magnet comprises first and second magnets arranged to face each other with respect to the fine pattern coil interposed therebetween.

19. The optical pickup actuator of claim 16, further comprises a yoke which fixes the magnet to the base and forms a magnetic path.

20. The optical pickup actuator of claim 17, wherein the magnet is 4-pole magnetized and surface divided such that the magnet is of a 2×2 format and is sectioned in a cross type along a first polarization line parallel to a focus driving direction of the blade and a second polarization line parallel to the track direction of the blade.

21. The optical pickup actuator of claim 20, wherein the magnet comprises first, second, third and fourth magnet portions respectively arranged in first, second, third and fourth quadrants such that adjacent magnet portions are polarized to have opposite poles.

22. The optical pickup actuator of claim 21, wherein the first, second, third and fourth magnet portions are formed without an interval space therebetween.

23. The optical pickup actuator of claim 17, wherein the magnet comprises two magnets each of which is 2-pole magnetized and surface divided.

24. The optical pickup actuator of claim 23, wherein the magnet comprises first, second, third and fourth magnet portions, wherein the first and second magnet portions are arranged close to each other and magnetic poles thereof are polarized to be opposite to each other with respect to a first polarization line which is parallel to a focus driving direction of the blade, and the third and fourth magnet portions are arranged close to each other and the magnetic poles thereof are polarized to be opposite to each other with respect to the first polarization line.

25. The optical pickup actuator of claim 24, wherein the third and fourth magnet portions are respectively separated a predetermined distance from the first and second magnet portions in the focus driving direction of the blade.

26. The optical pickup actuator of claim 25, wherein the first and fourth magnet portions have opposite magnetic poles while the second and third magnetic portions having opposite magnetic poles.

* * * * *